May 5, 1970   S. F. LINDQUIST   3,509,679
PLANAR BODY MOUNT SURFACE IN BOX SECTION FRAME ELEMENT
Filed Oct. 24, 1965

INVENTOR
STANLEY F. LINDQUIST
BY
Howard J. Barnett
ATTORNEY

United States Patent Office 3,509,679
Patented May 5, 1970

3,509,679
PLANAR BODY MOUNT SURFACE IN BOX SECTION FRAME ELEMENT
Stanley F. Lindquist, Milwaukee, Wis., assignor to A. O. Smith Corporation, Milwaukee, Wis., a corporation of New York
Filed Oct. 24, 1965, Ser. No. 504,564
Int. Cl. *E04c 3/30*
U.S. Cl. 52—731
4 Claims

ABSTRACT OF THE DISCLOSURE

A body mount surface for a vehicle frame member. The frame member comprises a pair of flanges disposed in lapping contiguous relation and a portion of one flange is offset and located in co-planar relation with the other flange to provide a planar mount supporting surface. The edge of at least one of the flanges is provided with a recess coextensive with the length of the offset portion to accommodate the width of overlap. The planar supporting surface is provided with an opening to receive a body mount.

---

This invention is directed to a planar body mounting surface in a box section frame element, and more particularly, to a modified flange overlap construction of the top flanges of the channel member components comprising a box section frame element to provide a flat area for a body mount in the area of flange overlap. The flat, horizontal surface is obtained by offsetting the outer overlapping flange of the box section downwardly an amount equal to its material gage and thickness, and by trimming the flanges of both members so that a portion of the body mount bolt passage is incorporated in each flange, and the flanges present a planar body mount surface immediately surrounding the body mount bolt passage. The rubber annular pad of the body mount is disposed between a flat, horizontal body surface, and the planar body mount surface of the frame element just described, and is thereby subjected to balanced compressive forces without requiring additional retainer housings for the rubber pad.

The invention is particularly applicable to vehicle frames in which insufficient flange material is available to provide a flat area for the body mount pad in a single flange in the conventional manner. The invention actually permits a substantial saving in metal in many box section frame elements, because more efficient metal blanking is possible, and no extra flange material is required to provide the important flat surface for the rubber body mount pad.

The drawings illustrate the best mode presently contemplated of carrying out the invention.

In the drawings.

Figure 1:
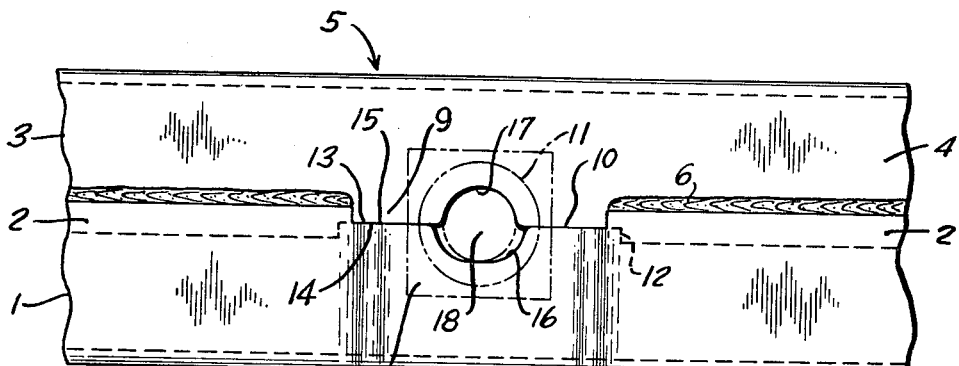
FIG. 1 is a top plan view of a portion of a box section frame element incorporating the invention.
Figure 2:
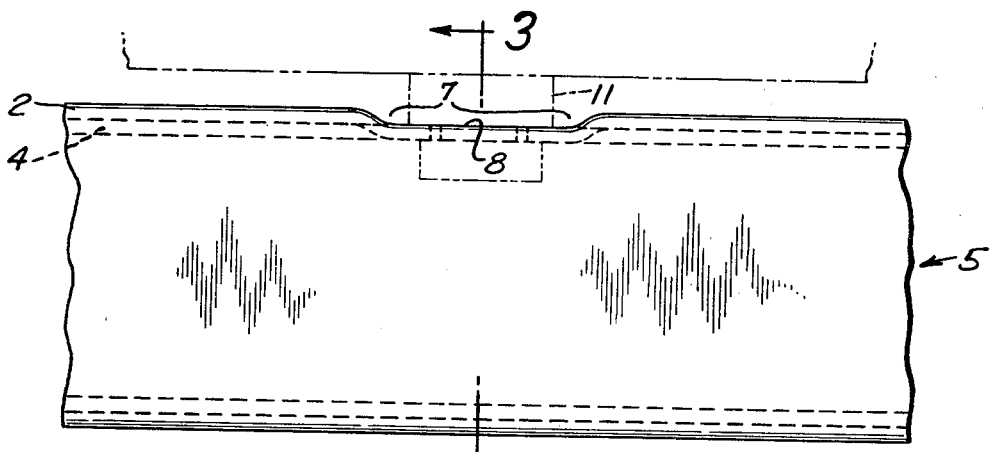
FIG. 2 is a side elevation of the frame element shown in FIG. 1.
Figure 3:
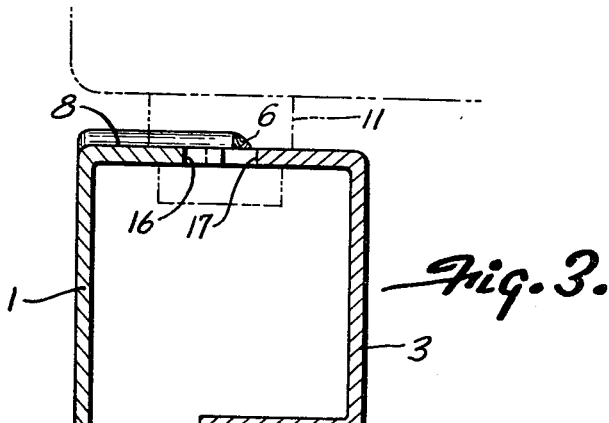
FIG. 3 is a section taken along line 3—3 of FIG. 2

As shown in the drawings, a first channel member 1 having a top flange 2 is assembled together with a second channel member 3 having a flange 4 to define a box section frame element 5. The channel members 1 and 3 are secured together by a weld 6. The top flange 2 of channel member 1 is the outer fitting flange in the assembly, and top flange 2 is offset downwardly, and includes a downward offset portion 7 to provide a flat top surface 8 therein which is co-planar with flat top surface 9 of the second channel member 3. The top flange 2 of the first channel member 1 is also provided with an inset 10 in the downward offset portion 7 to equally divide support of a body mount pad 11 (shown in phantom) between flanges 2 and 4. The flange 4 is provided with a similar inset 12 so that when channel members 1 and 3 are assembled, as shown in FIG. 1, there is horizontal flange edge interface 13 between edges 14 and 15 of the insets 10 and 12, respectively.

Edges 14 and 15 include semi-cylindrical sump portions 16 and 17, respectively, which, when assembled, define a bolt passage 18 for receiving a body mount bolt (not shown) to hold the rubber pad 11 in place between the frame. Either of the sump portions 16 or 17 may be oversized in the fore and aft direction to accommodate mismatch in the assembly.

The offsetting, trimming, and sump forming steps may be incorporated into the conventional forming operations of fabricating the channel members 1 and 3, so that no additional handling operations are required. Where frame fabrication volume is substantial, the economies in conserving valuable steel by designing for minimum flange width is most significant.

This invention provides a composite, planar body mount surface in a box section frame element fabricated from a pair of channel members through the complementary interfitting of the adjacent flanges. No additional manufacturing steps are required, and the invention realizes significant metal savings in flange widths, which increase in direct proportion to manufacturing volume.

I claim:

1. In a frame construction, a structural member, comprising a first frame element including a first flange terminating in a first edge, and a second frame element having a second flange terminating in a second edge, said first flange being in lapping contiguous relation to said second flange, a section of said first flange being offset and disposed in co-planar relation with said second flange to provide a composite planar mount supporting surface, at least one of said edges being provided with a recess coextensive with and corresponding generally in length to the length of said offset section to accommodate the width of overlap of said overlapping flanges so that the portion of the first edge in said offset section is in abutting relation with said second edge, said planar supporting surface being provided with a mount opening to receive a body mount.

2. The structure defined by claim 1, wherein both of said edges have recesses and each recess has a depth approximately to one-half of the overlap; and wherein said mount opening comprises two generally complimentary semi-cylindrical sumps formed in each flange bordering the recess therein.

3. The apparatus of claim 1, in which said first and second frame elements are facing channel members which together form a box section structural member.

4. The apparatus of claim 1, wherein the structural member is a vehicle frame member for supporting a vehicle body with body mounts bolted between the frame and body, said first flange being in overlapping relation with the second flange, and the planar mount support surface being defined in combination by portions of the top surfaces of the two flanges, approximately half of the support surface being comprised of a portion of the second flange and the second half of said support surface being comprised of said offset section on the first flange, said offset section being downwardly offset to be coplanar with the second flange, and the mount opening is formed centrally of the composite support surface.

References Cited

UNITED STATES PATENTS

| | | | |
|---|---|---|---|
| 1,440,658 | 1/1923 | Coapman | 29—465 |
| 1,931,105 | 10/1933 | Crawford et al. | 29—463 X |
| 2,253,384 | 8/1941 | Lown et al. | 29—463 |

BOBBY R. GAY, Primary Examiner

A. M. CALVERT, Assistant Examiner

U.S. Cl. X.R.

105—213